United States Patent [19]

Moore

[11] Patent Number: 4,927,182
[45] Date of Patent: * May 22, 1990

[54] PIPELINE REPAIR CLAMP

[75] Inventor: Billy G. Moore, Montebello, Calif.

[73] Assignee: Koppl Industrial Systems, Inc., Montebello, Calif.

[ * ] Notice: The portion of the term of this patent subsequent to Sep. 22, 2006 has been disclaimed.

[21] Appl. No.: 57,309

[22] Filed: Jun. 4, 1987

[51] Int. Cl.⁵ ............................................. F16L 55/16
[52] U.S. Cl. .................. 285/15; 277/206 A; 277/236; 285/917
[58] Field of Search ............... 285/15, 917, 97; 277/206 A, 236, 34.3

[56] References Cited

U.S. PATENT DOCUMENTS

| 3,047,301 | 7/1962 | Taylor et al. | 277/236 X |
| 3,542,380 | 11/1970 | Klein | 277/206 A X |
| 4,171,142 | 10/1979 | Harrison | 285/15 X |
| 4,568,091 | 2/1986 | Harrison | 285/15 X |
| 4,676,531 | 6/1987 | Martin | 285/226 X |

FOREIGN PATENT DOCUMENTS

| 711358 | 9/1941 | Fed. Rep. of Germany | 277/206 A |
| 550298 | 12/1922 | France | 277/206.1 |

Primary Examiner—Thomas F. Callaghan
Attorney, Agent, or Firm—Harris, Kern, Wallen & Tinsley

[57] ABSTRACT

A clamp for repair of a leak in a pipeline or other structure having a flanged joint. The clamp comprises arcuate clamp sections, typically two semi-circular sections, which are assembled end to end to form a clamp ring about the flanges at the site of the leak. Each clamp section has an inner surface with spaced edges, and a seal tube of deformable metal is attached to each of the clamp sections at each of the edges, with the metal tube having a folded wall with ridges and troughs.

6 Claims, 2 Drawing Sheets

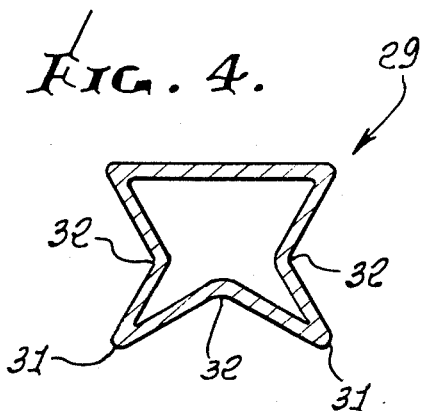
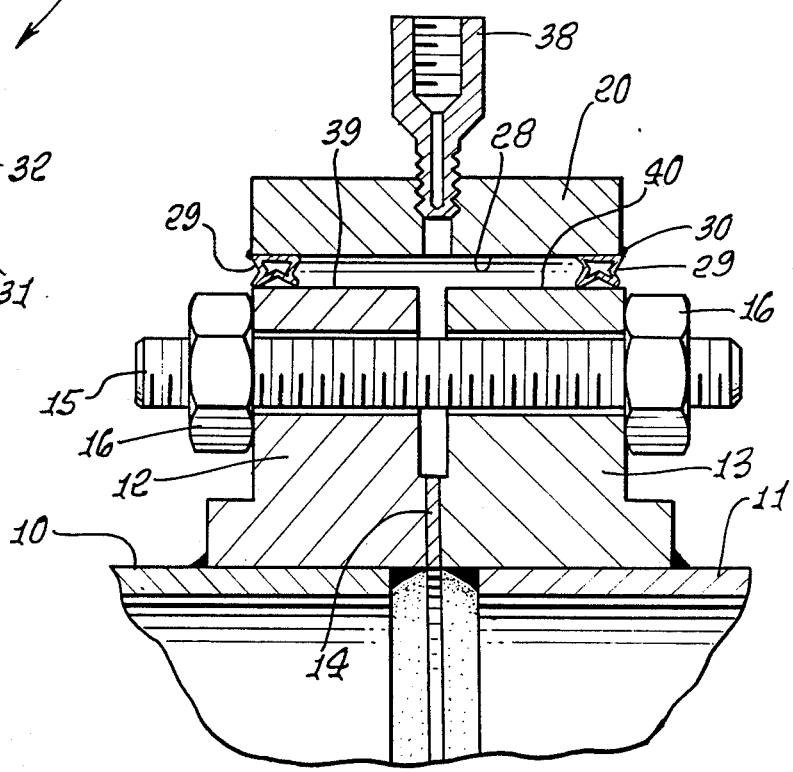
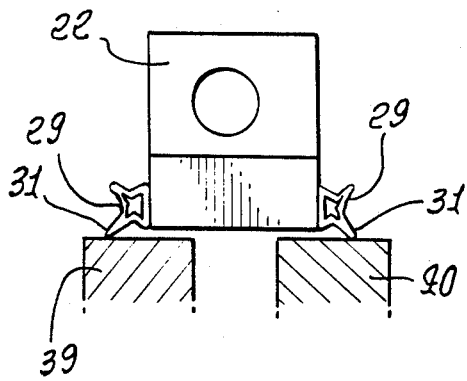
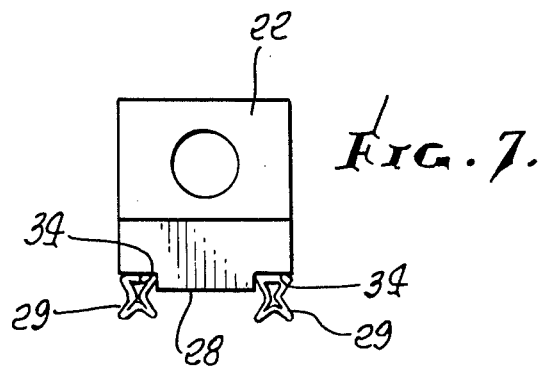
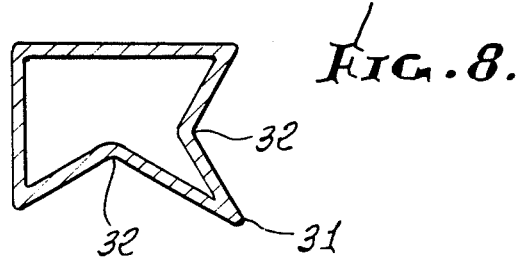

PIPELINE REPAIR CLAMP

BACKGROUND OF THE INVENTION

This invention relates to a clamp for the repair of a leak in a pipeline or other structure having a flanged joint. A typical clamp usually consists of two semi-circular clamp sections which are bolted together to form a clamp ring about the site of the leak at the flanges. Some form of seal is incorporated in the clamp sections to define an enclosed annular space between the clamp and the flanges. A sealant material is injected into this enclosed space, usually through a wall of the clamp, to complete the leak sealing operation.

This method of sealing off a leak is widely followed in the industry, and a variety of clamps are known and in use.

A typical leak repair clamp is shown in U.S. Pat. No. 3,550,638. Metal tubes 26, 28 are positioned in parallel grooves in the inner surface of each of the clamp sections. When the clamp sections are joined together around the pipeline flanges, the tubes are deformed to provide sealing engagement with the flanges and define the enclosed space into which the sealant is injected through a valve 45.

An alternative clamp configuration is shown in U.S. Pat. No. 3,467,141 which utilizes interior gaskets 26, 28 held in place by spring fingers 30. U.S. Pat. No. 3,603,616 shows a structure similar to that of the preceding patent, and utilizes a locating lug 38 for positioning the clamp at the gap between the pipe flanges.

In the clamp of U.S. Pat. No. 4,049,296, elastomer seals 20 are clamped in place in interior grooves in the clamp sections by retaining members 21. U.S. Pat. No. 4,240,650 shows another alternative form which utilizes three parallel grooves in the clamp, with no other sealing structure. U.S. Pat. No. 4,209,029 shows a variation which utilizes two clamps with facing annular grooves to define the enclosed annulus for receiving the sealant.

U.S. Pat. No. 3,152,816 shows another form of clamp which utilizes plates 35, 60 for positioning between the flanges underneath the clamp ring.

These various prior art designs suffer from various problems such as the requirement of additional loose parts, elastomer seals, separate seals or gaskets, special grooves, and the like. Such loose and separate parts or seals add cost and complexity to the clamp and are often lost in adverse conditions under which many such clamps are installed. Elastomer seals and gaskets are undesirable for many high temperature and chemical leaks which attack elastomers. Such a situation is common and leaks frequently reoccur after the seals break down. Also, the various seals in the prior art which define the enclosed annulus for the sealant, are contained within the clamp ring structure when installed on the pipeline, thereby preventing any access to the seal point of engagement between the clamp and the pipeline; such acess may be desirable to make adjustments on difficult leaks.

It is an object of the present invention to provide a new and improved clamp for repair of a leak in a pipeline which clamp does not require any springs, spring fingers or other seal retention/pre-loading means, nor any separate seals or gaskets or other separate components, nor any elastomer materials. It is another object of the invention to provide such a clamp which can utilize clamp sections having a simple continuous surface without any special machining for retaining grooves for gaskets, seals or the like. It is a particular object of the invention to provide such a clamp with a structure which leaves the seal point of engagement between the clamp and the pipeline accessible after installation so that the seal can be custom fitted by peening or the like.

These and other objects, advantages, features and results will more fully appear in the course of the following description.

SUMMARY OF THE INVENTION

A clamp suitable for repair of a leak at a flanged joint and comprising a plurality of arcuate clamp sections for assembly end to end to form a clamp ring about the flanges at the site of the leak. A clamp wherein each of the clamp sections has an inner surface with spaced edges, with the inner surface preferably being a continuous arcuate smooth surface. A tube of deformable metal fixed to each of the clamp sections at each of the edges thereof, with the tube having a folded wall with a ridge between troughs with the ridge being deformable by pressure engagement between the clamp and the pipeline and deformable by peening on a ridge at a trough.

BRIEF DESCRIPTION OF THE DRAWINGS

FIG. 4 is an enlarged sectional view of the tube shown in FIG. 3;

FIG. 5 is a partial sectional view taken along the line 5—5 of FIG. 1;

FIGS. 6 and 7 are views similar to that of FIG. 3, showing alternative embodiments of the invention; and FIG. 8 is a view similar to that of FIG. 4 showing an alternative configuration for the tube.

DESCRIPTION OF THE PREFERRED EMBODIMENTS

The preferred embodiment of the invention illustrated and described herein is for use with the circular flanges of a joint in a pipeline. However the invention is equally usable with other devices having flanged joints, such as tank manway covers and valve bonnets, and with other flange shapes such as rectangular, square, hexagonal and oval.

Figure 1:
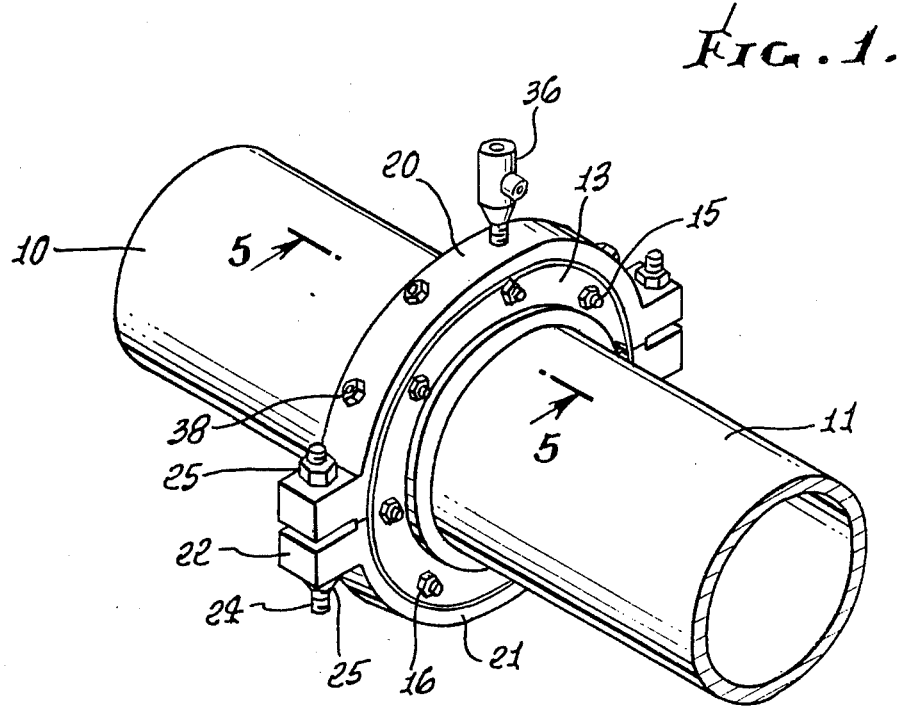
FIG. 1 is a perspective view of a clamp positioned about a flanged coupling of a pipeline, and incorporating the presently preferred embodiment of the invention.
Figure 2:
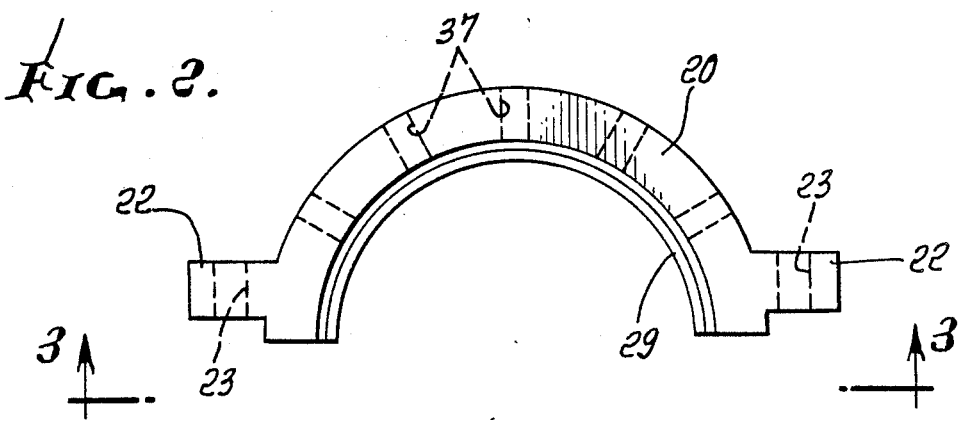
FIG. 2 is a side view of one of the clamp sections of the clamp of FIG. 1.

A pipe coupling between lengths of pipe 10 and 11 is shown in FIGS. 1 and 5. A flange 12 is attached to the end of the length of pipe 10, typically by welding, and a similar flange 13 is attached to the end of the length of pipe 11. A gasket 14 is positioned between abutting faces of the flanges 12, 13, and the flanges are joined together by studs 15 passing through aligned openings in the flanges 12, 13, with nuts 16 on each end of each stud 15. This flanged coupling construction is typical of that utilizes in the pipeline industry.

During use of the pipeline, a leak may occur through the gasket 14. One way to repair the leak is to remove the nuts and studs, separate the two flanges, remove the old gasket and insert a new gasket, and reconnect the flanges. This type of pair requires shutdown of the pipeline, and therefore the repair clamp has been developed to provide a temporary and sometimes relatively permanent repair of the leak without affecting the operation of the pipeline. Sealing is accomplished by positioning a clamp around the site of the leak, typically around the flanges at the coupling, to define an enclosed annular space, and then introducing a sealant into this space.

The present invention is directed to a new form of clamp construction for use in this type of sealing operation. The preferred embodiment of the invention utilizes two semi-circular clamp sections 20, 21, with each clamp section having a flange 22 at each end, with aligned openings 23 in the flanges. The two clamp sections 20, 21 are positioned on the flanges 12–13 from opposite sides, and are joined by studs 24 and nuts 25, with the studs through the aligned openings 23.

In the preferred embodiment illustrated, each of the clamp sections has a smooth continuous inner surface 28 with a seal tube 29 attached at each edge. Typically the seal tube is attached by welding as indicated at 30 on FIGS. 3 and 5.

The presently preferred form of the seal tube 29 is shown in cross section in FIG. 4. The seal tube is usually formed of a deformable metal, typically steel, although other materials may be used where desired. The seal tube has a folded wall with ridges 31 and troughs 32, with two ridges and three troughs as shown in FIG. 4 being preferred. Alternatively, four ridges and four troughs could be utilized, and one ridge and two troughs could be utilized as shown in FIG. 8. The seal tube material is formed in the desired cross-section. By way of example, the tube would be drawn or extruded initially in the desired cross section configuration. As another example conventional circular or square tubing may be obtained in straight lengths and press formed to the desired cross section configuration.

Figure 3:
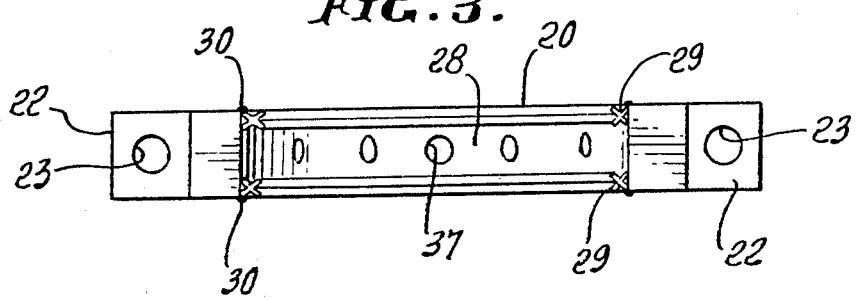
FIG. 3 is a partial bottom view of the clamp section of FIG. 2.

After obtaining the desired cross section shape, a proper length of seal tube is bent to a curve to fit within the clamp section and is welded into position. In the preferred embodiment, the seal tubes are fixed to the clamp section along each edge at the inner surface, as shown in FIG. 3. In an alternative arrangement, the tubes could be attached to the clamp section at each edge on opposite sides, as shown in FIG. 6 for placement between widely spaced flanges. In another alternative arrangement, a groove 34 can be provided in the inner surface 28 of each clamp section, and the tube be positioned in the groove, as shown in FIG. 7. This arrangement does require a machining step in forming the grooves.

In use, the clamp sections are positioned around the pipeline and joined together by the studs 24 and nuts 25. The clamp with the seal tubes is dimensioned so that there is an interference fit between the seal tubes and the pipeline flanges when the clamp is fully bolted together. As the clamp sections are being drawn together by the nuts on the studs, the ridges 31 of the seal tubes engage the flanges at the peripheries 39, 40 and are deformed to provide an intimate seal between the clamp and the flange peripheries. The clamp sections will be tightened down to provide continuous contact between the ridges 31 and the flange peripheries. Frequently, flanges like 12 and 13 are manufactured with rough or out of round outer surfaces 39, 40. In that case, the interior curved surface 28 of the clamp and its attached seal tubes may not make completely adequate intimate contact at all points around the surfaces 39, 40. If gaps are visible at locations around the periphery of the flange, the seal tube may be peened to close such gap. This is accomplished by applying blows, such as by a hammer or a hammer and punch, at the exposed troughs 32 adjacent to the ridge 31, to deform the ridge into engagement with the flange rim.

The next step is to introduce the sealant into the annulus formed by the clamp sections, the seal tubes and the pipeline flanges. This is carried out in a manner well known to the industry, as by inserting injection valves 36 into threaded openings 37 in the clamp sections, and introducing the sealant through the appropriate valves. After sealant injection is completed, the injection valves may be replaced by suitable closures such as pipe plugs or if a curing sealant is used, completion plugs 38, common to the industry.

During the sealant injection process, the seal between the seal tubes and the pipeline flanges are inspected for the presence of sealant. Where sealant is exuding at the joint between the clamp seal tube ridge 31 and pipeline flange, the small opening can be closed by peening at the seal tube trough to force the seal tube ridge into better sealing engagement with the pipeline flange.

I claim:

1. In a clamp for repair of a leak at a flanged joint, said clamp comprising a plurality of arcuate clamp sections for assembly end to end to form a clamp ring positionable about the flanges of the joint, with each of said clamp sections having an inner surface with spaced edges, the improvement comprising a seal tube of deformable metal fixed to each of said clamp sections at each of said edges, with each of said seal tubes having a folded wall with at least one ridge between troughs, with said ridge exposed adjacent the clamp section edge when in engagement with a flange, and deformable by pressure engagement between said clamp and flanges and deformable by peening on said ridge at a trough to obtain a cold-forged metallic joint between the clamp and the flange.

2. A clamp as defined in claim 1 wherein said seal tube has a folded wall with two ridges and three troughs.

3. A clamp as defined in claims 1 wherein each of said clamp sections has a smooth inner surface.

4. A clamp as defined in any of claims 1–3 wherein each of said seal tubes is attached to the inner surface of the clamp section.

5. A clamp as defined in any of claims 1–3 wherein each of said seal tubes is attached to a side wall of said clamp section.

6. A clamp as defined in any of claims 1 and 2 wherein each of said clamp sections has a groove in the inner surface at each of said edges, with said seal tubes positioned in said grooves.

* * * * *